United States Patent
Blouin et al.

(10) Patent No.: US 12,151,514 B2
(45) Date of Patent: Nov. 26, 2024

(54) PNEUMATIC TIRE

(71) Applicant: COMPAGNIE GENERALE DES ETABLISSEMENTS MICHELIN, Clermont-Ferrand (FR)

(72) Inventors: Damien Blouin, Clermont-Ferrand (FR); Quentin Bonneton, Clermont-Ferrand (FR); Marion Cavro, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 329 days.

(21) Appl. No.: 16/965,084

(22) PCT Filed: Jan. 28, 2019

(86) PCT No.: PCT/FR2019/050175
§ 371 (c)(1),
(2) Date: Jul. 27, 2020

(87) PCT Pub. No.: WO2019/145656
PCT Pub. Date: Aug. 1, 2019

(65) Prior Publication Data
US 2021/0114417 A1 Apr. 22, 2021

(30) Foreign Application Priority Data

Jan. 28, 2018 (FR) .................................... 18/70086

(51) Int. Cl.
*B60C 11/12* (2006.01)
*B60C 11/03* (2006.01)

(52) U.S. Cl.
CPC ...... *B60C 11/1281* (2013.01); *B60C 11/0302* (2013.01); *B60C 11/0323* (2013.01);
(Continued)

(58) Field of Classification Search
CPC ............ B60C 11/0304; B60C 11/1281; B60C 2011/1268; B60C 2011/1286;
(Continued)

(56) References Cited

U.S. PATENT DOCUMENTS

| 4,667,718 A | * | 5/1987 | Fontaine | ................. B60C 11/11 |
| | | | | 152/902 |
| D354,029 S | * | 1/1995 | Voigt | ........................... D12/564 |

(Continued)

FOREIGN PATENT DOCUMENTS

| DE | 10 2007 044 435 | 3/2009 |
| EP | 0 729 854 | 9/1996 |

(Continued)

OTHER PUBLICATIONS

English machine translation of EP-0788899-A1. (Year: 1997).*
English machine translation of WO-2019020232-A1. (Year: 2019).*

*Primary Examiner* — Robert C Dye
(74) *Attorney, Agent, or Firm* — Cozen O'Connor

(57) ABSTRACT

Pneumatic tire comprising a tread (1) provided with two edges (2), a center (3) and a plurality of tread bars (10) distributed in a circumferential direction, each tread bar (10) extending in an oblique direction from one of the edges (2) towards the center (3) of said tread (1), the plurality of tread bars (10) comprising at least two adjacent tread bars (11, 12); each of said adjacent tread bars (11, 12) has at least one incision (20, 21, 23) extending along the length of the tread bar, each adjacent tread bar has an overall incision length (LGI) corresponding to the sum of the lengths of the incisions that are part of said tread bar, the widths (LB11, LB12) of said adjacent tread bars (11, 12) are different, and the overall incision length (LGI) in said adjacent tread bars (11, 12) is different.

13 Claims, 3 Drawing Sheets

(52) U.S. Cl.
CPC ... *B60C 11/1259* (2013.01); *B60C 2011/0313* (2013.01); *B60C 2011/1268* (2013.01); *B60C 2011/1295* (2013.01)

(58) Field of Classification Search
CPC ........... B60C 2011/129; B60C 11/0302; B60C 11/0311; B60C 2011/0313; B60C 11/129; B60C 11/1236
See application file for complete search history.

(56) References Cited

U.S. PATENT DOCUMENTS

| | | | | |
|---|---|---|---|---|
| 5,435,366 | A | * | 7/1995 | Voigt ................. B60C 11/0306 152/DIG. 3 |
| 5,591,280 | A | * | 1/1997 | Asano ................. B60C 11/1263 152/DIG. 3 |
| 2007/0095447 | A1 | | 5/2007 | Nguyen et al. |
| 2009/0159167 | A1 | * | 6/2009 | Scheuren ............ B60C 11/1281 425/470 |
| 2012/0267021 | A1 | * | 10/2012 | Guichon ............. B60C 11/1392 152/209.24 |
| 2013/0000805 | A1 | * | 1/2013 | Oodaira ............. B60C 11/1263 152/209.1 |
| 2016/0114629 | A1 | * | 4/2016 | Hashimoto ............. B60C 11/12 152/209.1 |
| 2016/0297249 | A1 | * | 10/2016 | Ishino ................. B60C 11/1236 |
| 2016/0375729 | A1 | * | 12/2016 | Kaneko ............... B60C 11/0083 152/209.25 |
| 2017/0120684 | A1 | * | 5/2017 | Katayama ........... B60C 11/0302 |
| 2018/0022163 | A1 | * | 1/2018 | Mosnier ................. B60C 11/11 152/209.18 |

FOREIGN PATENT DOCUMENTS

| | | | | |
|---|---|---|---|---|
| EP | 0 775 600 | | 5/1997 | |
| EP | 0788899 A1 | * | 8/1997 | ......... B60C 11/0302 |
| EP | 2 965 925 | | 1/2016 | |
| FR | 2 998 511 | | 5/2014 | |
| JP | 1986-143904 U | | 2/1986 | |
| WO | WO 2012-72404 | | 6/2012 | |
| WO | WO-2019020232 A1 | * | 1/2019 | ......... B60C 11/0302 |

* cited by examiner

PNEUMATIC TIRE

RELATED APPLICATIONS

This is a U.S. National Phase Application under 35 USC 371 of International Application PCT/FR2019/050175 filed on Jan. 28, 2019.

This application claims the priority of French application no. 18/70086 filed Jan. 28, 2018, the entire content of which is hereby incorporated by reference.

TECHNICAL FIELD OF THE INVENTION

The present invention relates to a tire having a tread provided with two edges, a centre and a plurality of blocks distributed in a circumferential direction, each block extending from one of the edges towards the centre of said tread in an oblique direction, the plurality of blocks comprising at least two adjacent blocks, each adjacent block of said two adjacent blocks having at least one sipe extending along the length of the block.

BACKGROUND OF THE INVENTION

The document FR2998511 describes a tread for a snow tire having a plurality of blocks separated by grooves. The blocks are provided with sipes that are separated into a plurality of parts starting from a certain depth, these being known as complex sipes. Each complex sipe has, as seen in cross section, a first, rectilinear part extending radially from the tread surface of the tread, and a second part that continues the first part and has at least two branches, each comprising an end. The tread also comprises cavities, each cavity extending between the branches of a complex sipe. Each cavity comprises a bottom situated at the same level as the ends of the branches. The cavities and the grooves of the tread are configured such that this tread has a surface void ratio at the end of wear greater than or equal to 35%. Moreover, the distance D between two branches of two adjacent complex sipes is at least equal to 2 mm.

This embodiment makes it possible, from a certain level of wear, to generate cavities for improving the performance on snow-covered ground.

The document US2007095447 describes a tire tread having blocks provided with grooves. Under the surface of the blocks in the new state thereof, the grooves have widened portions, forming widened grooves when the wear to the tread reaches the region of the widened portions.

All of these embodiments make it possible to extend the performance of the tires in the course of wear. However, manufacturers are always seeking performance improvements, in particular for tires designed for winter, when the conditions are particularly difficult, in particular because of the very variable running conditions to be taken into account, with rain, snow, ice, not forgetting dry ground. It is particularly tricky to take these wide ranges of conditions into account because solutions that work well in certain conditions sometimes lead to worse results in other conditions. Furthermore, the requirements in terms of noise are also becoming increasingly restrictive.

Therefore, a need remains for tire treads that make it possible to improve performance over a wide range of aspects.

SUMMARY OF THE INVENTION

First of all, a first objective of the invention consists in providing a tire, the tread of which makes it possible to reduce noise generated during running.

Another objective of the invention consists in providing a tread that makes it possible to obtain an excellent compromise in terms of grip on snow-covered ground/wet ground while maintaining performance on dry ground.

Another objective of the invention consists in providing a tread for a tire that makes it possible to improve endurance.

To this end, an embodiment of the invention provides a tire having a tread provided with two edges, a centre and a plurality of blocks distributed in a circumferential direction, each block extending towards the centre of said tread in an oblique direction, the plurality of blocks comprising at least two adjacent blocks, each adjacent block of said adjacent blocks having at least one sipe extending along the length of the block, each adjacent block having an overall sipes length LGI corresponding to the sum of the lengths of the sipes belonging to said block, widths LB11 and LB12 of said adjacent blocks being different and the overall sipes length LGI in said adjacent blocks being different.

Such an arrangement makes it possible, by minimizing resonance frequencies, to reduce the noise generated during running. For the blocks of reduced width, in order to maintain sufficient space between the sipes and thus make it possible to preserve the level of stiffness while avoiding the risks associated with possible tearing of block portions in the thinned regions, the sipes length is adapted, in this case by reducing it. Such a distribution of the sipes also makes it possible to obtain a good level of grip on snow-covered ground.

An oblique direction is understood to be between 30° and 60°, and more preferably approximately 45°, with respect to the circumferential median axis of the tire.

In order to obtain the width of a block, the average of the widths of the block that are measured transversely with respect to the sipe, at the starting point, at the end point and at the middle of the block, is preferably determined.

According to one advantageous embodiment, the sipes divide each block into two half-blocks, the separation being substantially in the longitudinal direction of the blocks.

Advantageously, for each of said adjacent blocks, the number of sipes Nib and the width LB of the block are chosen such that: $3.5\ mm < LB/(Nib+1) < 7\ mm$.

This feature makes it possible to maintain a substantially uniform level of stiffness between the blocks. The performance on snow-covered or wet ground is favoured.

According to another advantageous embodiment, at least one block of said adjacent blocks comprises a first sipe and a second sipe, each sipe extending along the length of said block, the first sipe having a depth $H_{GE}$, said first sipe having a widened portion in said depth, and said second sipe having a depth $H_L$, where $0.1\ H_{GE} < H_L < 0.9\ H_{GE}$.

The widened portion, for example in order to form a teardrop-shaped profile, makes it possible to preserve the characteristics and the performance of the tire while the tread wears down, including during an advanced level of wear, by gradually opening up widened regions of the sipes. The second sipe, which does not have a widened portion in its depth, advantageously forms a substantially rectangular profile. This type of profile makes it possible to regulate the density of sipes for good characteristics of grip of snow-covered ground, while maintaining a good level of block stiffness.

According to an advantageous variant, said second sipe has a depth $H_L$, where $0.4\ H_{GE} < H_L < 0.6\ H_{GE}$.

According to a further advantageous embodiment, the depth $H_{GE}$ of the first sipe is between 6 mm and 8 mm. Such a depth makes it possible to prolong the characteristics even in the case of deep wear.

According to one advantageous embodiment, the first sipe divides the block into two half-blocks. Such a division makes it possible to optimize the performance of each of the half-blocks.

According to a further advantageous embodiment, at least one of said adjacent blocks extends substantially as far as one of the edges of said tread.

In a variant, said adjacent blocks extending as far as one of the edges of the tread comprise a groove separating at least one block into two axially spaced-apart parts.

According to another advantageous embodiment, each part of said adjacent block comprises a different number of sipes.

Advantageously, the tread is directional.

DESCRIPTION OF THE DRAWINGS

All the embodiment details are given in the following description, supplemented by FIGS. 1 to 6, which are given only by way of non-limiting examples and in which.

DETAILED DESCRIPTION OF THE DRAWINGS

Figure 2:
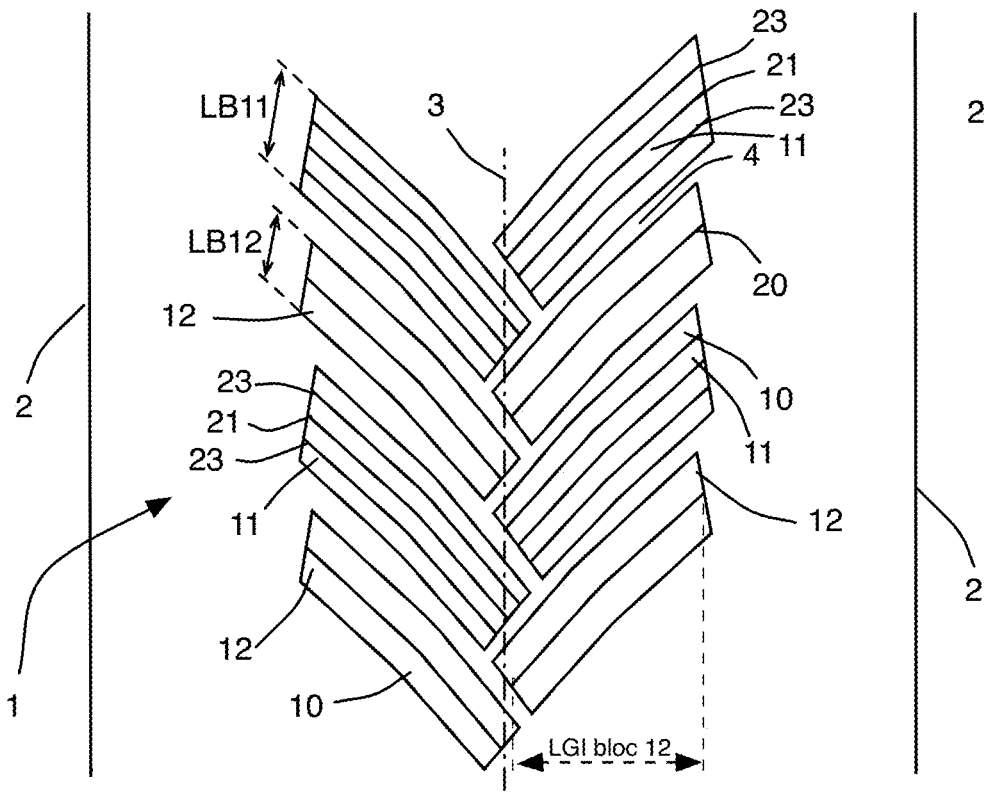
FIG. 2 is a schematic depiction of a portion of a tread corresponding substantially to the contact patch for a first exemplary embodiment.

FIG. 2 is a schematic depiction of a first implementation example illustrating a portion of a tread 1 of a tire. This tread has two edges 2, a central axis 3 and a plurality of blocks 10 distributed circumferentially over the tread. The blocks 10 are advantageously arranged with a certain inclination with respect to the axis 3, for example between 30° and 60°, and more preferably 45°. In the following text, this inclination is referred to as the oblique direction of the blocks.

In this embodiment, the blocks 10 start with a slight offset with respect to the edge 2 of the tread. They then continue towards the central axis 3. The plurality of blocks 10 comprises at least two adjacent blocks 11 and 12. The block 11 has a block width LB11 and the block 12 has a block width LB12. These blocks are each provided with at least one sipe 20, 21, 23 extending along the length of the block.

Figure 3:
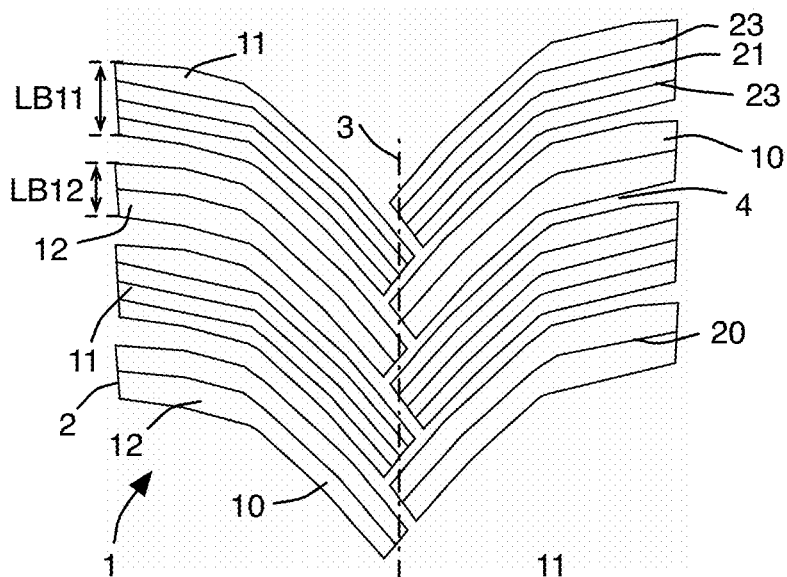
FIG. 3 is a schematic depiction of a portion of a tread corresponding substantially to the contact patch for a second exemplary embodiment.
Figure 4:
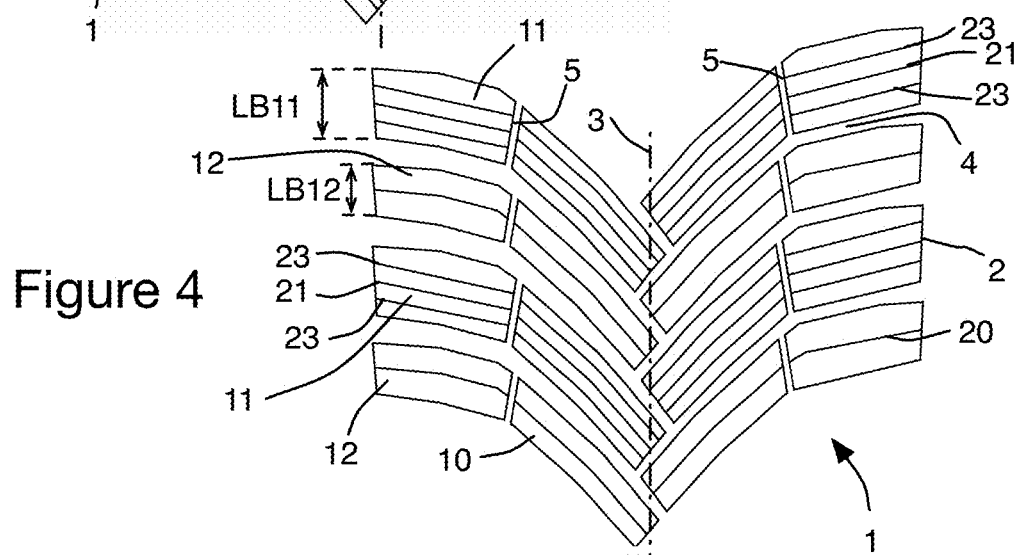
FIG. 4 is a schematic depiction of a portion of a tread corresponding substantially to the contact patch for an embodiment variant of the example in FIG. 3.
Figure 5:
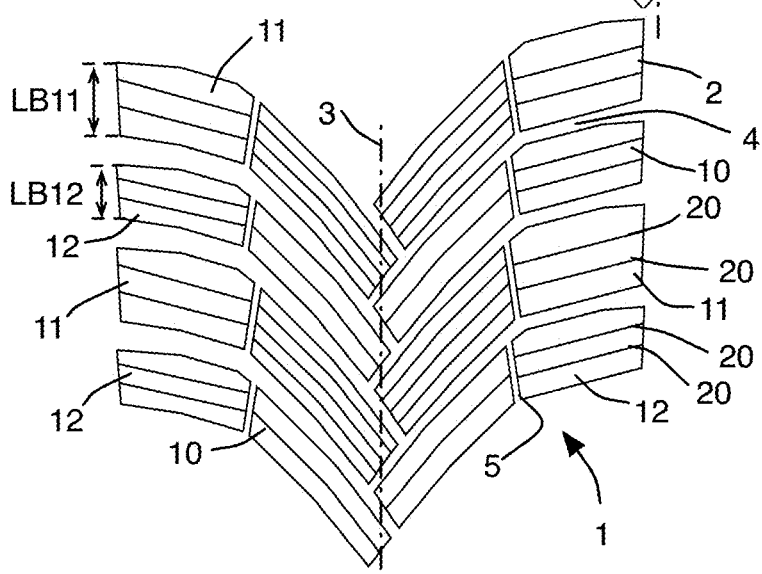
FIG. 5 is a schematic depiction of a portion of a tread corresponding substantially to the contact patch for another embodiment variant of the example in FIG. 3.

As can be seen in the example in FIG. 2, but also in the examples in FIGS. 3 to 5, the widths LB11 and LB12 of the two adjacent blocks 11 and 12 are different. In the examples illustrated, the width LB11 is greater than the width LB12.

These figures also make it possible to observe that the number of sipes Nib in these two adjacent blocks 11 and 12 is different. For each of the two adjacent blocks 11 and 12, the number of sipes Nib and the widths LB11 and LB12 of the blocks are chosen in accordance with the following dimensional relationship: 3.5 mm<LB/(Nib+1)<7 mm.

Figure 1:
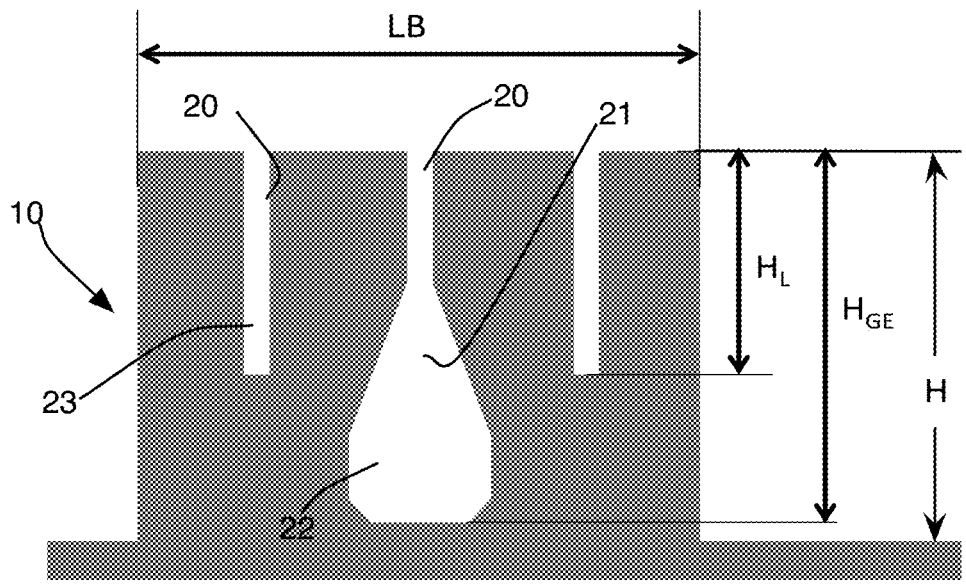
FIG. 1 is a schematic cross-sectional depiction of an example of a tread pattern block.

In the example in FIG. 2, there are three sipes extending along the blocks 11, dividing these blocks into four elongate and parallel parts. As can be seen in FIG. 1, which shows a cross section through an example of a block 10 comprising three sipes 20, the central sipe, referred to as the first sipe 21, has a depth $H_{GE}$ and has a widened portion 22 in the deepest portion. The first sipe 21 divides the block into two half-blocks.

The lateral sipes, referred to as second sipes 23, have a depth $H_L$. The depths $H_L$ and $H_{GE}$ are advantageously provided depending on the following relationship: $0.1\ H_{GE} < H_L < 0.9\ H_{GE}$. In a variant, the relationship is more restrictive, as follows: $0.4\ H_{GE} < H_L < 0.6\ H_{GE}$.

The depth $H_{GE}$ of the first sipe 21 is between 6 mm and 8 mm.

FIG. 3 is a schematic depiction of a second embodiment of the tire, in which at least one of said two adjacent blocks 11 and 12 extends substantially as far as one of the edges 2 of said tread 1. In the example illustrated, all of the blocks 10 extend as far as one of the edges 2. The axially outer portion of the blocks is slightly curved, such that the axially outer end of the blocks is substantially perpendicular to the circumferential axis 3.

FIG. 4 is a schematic depiction of a third embodiment of the tire, constituting a variant of the embodiment in FIG. 3, in which a groove 5 separates the blocks into two axially spaced-apart parts. In this exemplary embodiment, the number of sipes is identical in both parts of the blocks. The widest blocks 11, of width LB11, comprise three sipes, with an arrangement as illustrated in the block in FIG. 1. The narrower blocks 12, of width LB12, have a single sipe, with or without a widened portion 22.

FIG. 5 illustrates another embodiment variant, in which each part of the adjacent blocks comprises a different number of sipes 20, 21, 23. The sipes may or may not have a widened portion 22. In this example, the widest central blocks comprise three sipes and the widest lateral blocks 11 comprise two sipes. The narrower central blocks have a single sipe, and the narrower lateral blocks 12 have two sipes.

Figure 6:
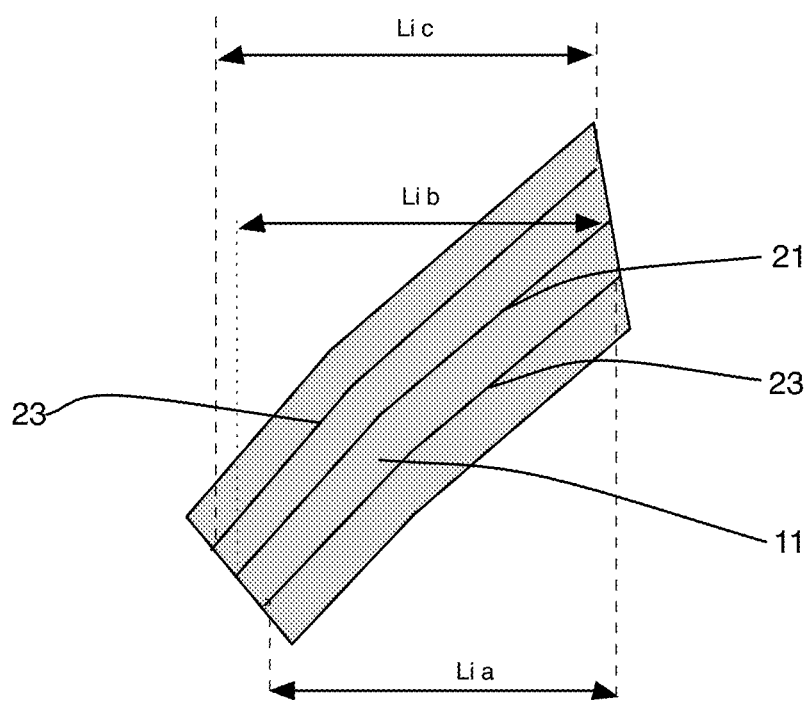
FIG. 6 is a schematic depiction of a tread block comprising a plurality of sipes, the lengths of each of the sipes being depicted.

The overall sipes length LGI of a block corresponds to the sum of the lengths each of the sipes of this block, taking the projection of the added length onto a transverse axis (perpendicular to the axis 3 of the tire) into account. FIG. 6 is a schematic depiction of a tread block 11 having a central sipe 21 and two lateral sipes 23. The lengths of each of the sipes are represented as follows: Li a for the length of the bottom sipe 23 in the figure, Li b for the length of the central sipe 21 of the block and Li c for the length of the top sipe 23 in the figure. The overall sipes length LGI of the block 11 in FIG. 6 is therefore the sum of the lengths Li a+Li b+Li c.

For a block 12 having a single sipe 20, the overall sipes length LGI of the block corresponds to the length of this single sipe, taking the projection of the added length onto a transverse axis (perpendicular to the axis 3 of the tire) into account. FIG. 2 illustrates an example of length LGI of a block 12.

In the different examples illustrated, the tread 1 is advantageously directional.

REFERENCE NUMERALS EMPLOYED IN THE FIGURES

| | |
|---|---|
| 1 | Tread |
| 2 | Tread edge |
| 3 | Tread central axis |

-continued

| 4 | Oblique groove |
| 10 | Blocks |
| 11, 12 | Adjacent blocks |
| 20 | Sipes |
| 21 | Sipe with widened portion |
| 22 | Widened portion |
| 23 | Sipe without widened portion |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire, comprising:
   a tread provided with two edges,
   a central axis, and
   a plurality of blocks distributed in a circumferential direction on both axial sides of the central axis, each block extending from one of the edges towards the central axis in an oblique direction with at least a portion of the each block over the central axis, the plurality of blocks comprising:
      at least two adjacent blocks that are circumferentially adjacent, each having a respective width, each adjacent block of said adjacent blocks having a respective at least one sipe extending along the entire length of the block and dividing the each block into a plurality of parallel parts, the at leaast one sipe extending substantially parallel to at least one block edge extending between the tread edges,
      each adjacent block having an overall pipe length LGI corresponding to a sum of the lenghts of the at least one sipe belonging to said block,
   wherein the respective widths of said adjacent blocks are different and the overall sipe length LGI in said adjacent blocks is different,
   wherein the plurality of blocks on each side of the central axis incline in an opposite oblique direction with respect to the circumferential median axis,
   wherein for each of said adjacent blocks having the respective width, the number of sipes Nib and the respective width of the each block LB are chosen such that: 3.5 mm<LB/(Nib+1)<7 mm,
   wherein at least one sipe comprises a first sipe that divides the each block into two parallel partial-blocks and has a widened portion that is teardrop-shaped, and
   wherein at least one block of said adjacent blocks comprises a second sipe that is parallel to the first sipe and is without a widened portion.

2. The tire according to claim 1, wherein the first sipe divides the each block into two parallel half-blocks, the separation being substantially in the longitudinal direction of the blocks.

3. The tire according to claim 1, wherein the first sipe has a depth $H_{GE}$, said first sipe having a widened portion in said depth, and in that said second sipe has a depth $H_L$, where $0.1\ H_{GE}<H_L<0.9\ H_{GE}$.

4. The tire according to claim 3, wherein said second sipe has a depth $H_L$, where $0.4\ H_{GE}<H_L<0.6\ H_{GE}$.

5. The tire according to claim 3, wherein the depth $H_{GE}$ of the first sipe is between 6 mm and 8 mm.

6. The tire according to claim 3, wherein the first sipe divides the block into two half-blocks.

7. The tire according to claim 3, wherein the widened portion begins before the depth $H_L$.

8. The tire according to claim 1, wherein at least one of said adjacent blocks extends substantially as far as one of the edges of said tread.

9. The tire according to claim 8, wherein said adjacent blocks extending as far as one of the edges of the tread comprise a groove separating at least one block into two axially spaced-apart parts.

10. The tire according to claim 9, wherein each part of the axially spaced-apart parts comprises a different number of sipes.

11. The tire according to claim 1, wherein the tread is directional.

12. The tire according to claim 1, wherein the oblique direction is between 30° and 60° with respect to the circumferential median axis.

13. The tire according to claim 1, wherein the widened portion is present on a central sipe.

* * * * *